United States Patent [19]
Fabian

[11] Patent Number: 5,244,503
[45] Date of Patent: Sep. 14, 1993

[54] POLYMERIC OIL ADSORBENTS

[75] Inventor: Klaus H. Fabian, Kriftel, Fed. Rep. of Germany

[73] Assignee: Hoechst AG, Fed. Rep. of Germany

[21] Appl. No.: 933,396

[22] Filed: Aug. 20, 1992

Related U.S. Application Data

[62] Division of Ser. No. 669,761, Mar. 15, 1991, abandoned.

[30] Foreign Application Priority Data

Mar. 17, 1990 [DE] Fed. Rep. of Germany ....... 4008693

[51] Int. Cl.$^5$ ................................................ B08B 7/00
[52] U.S. Cl. ...................................... 134/6; 210/691; 210/693
[58] Field of Search ..................... 134/6; 210/691, 693

[56] References Cited

U.S. PATENT DOCUMENTS 4,566,911  1/1986  Tomita et al. ........................... 134/6
5,085,781  2/1992  Tsuru et al. ..................... 210/691 X Primary Examiner—Patrick P. Garvin
Attorney, Agent, or Firm—Bierman and Muselian

[57] ABSTRACT

Solid adsorbents for soaking up or binding adsorbates from the group comprising mineral oils, ester oils, liquid hydrocarbons and other liquid inert organic compounds or mixtures thereof which comprise, as adsorptive components, a finely disperse to granular polyvinyl acetal insoluble in water and in the adsorbates, preferably polyvinyl butyral.

Use of the adsorbents for soaking up or adsorptive binding and, as appropriate, for subsequent disposal or reprocessing of products, which may acutely pollute the environment, from the group comprising crude oil, tar oil, lubricating oil, lubricating grease, mineral oil, petroleum, hydraulic oil, paraffin oil, spindle oil, light and heavy fuel oil, diesel oil, kerosene, gasoline, benzene, liquid organic pesticides or pesticide solutions, vegetable oils and fats, animal oils and fats and, if appropriate, aqueous emulsions or suspensions of the said products.

2 Claims, No Drawings

POLYMERIC OIL ADSORBENTS

PRIOR APPLICATION

This application is a division of U.S. Pat. application Ser. No. 669,671 filed Mar. 15, 1991, now abandoned.

DESCRIPTION

The invention relates to solid adsorbents for soaking up or binding adsorbates from the group comprising mineral oils, ester oils, liquid hydrocarbons and other liquid inert organic compounds or mixtures thereof, these adsorbents comprising a finely disperse to granular polyvinyl acetal insoluble in water and in the adsorbates, as the adsorptive components, and to the use thereof.

As is known, adsorption comprises the selective enrichment of certain substances on the surface of in most cases solid auxiliaries. These auxiliaries, called adsorbents, have in general large surface areas, mainly in the form of pores, and are used in the form of granules or also as powder. The particle sizes of the granules can here have diameters of up to several mm.

The most usual and, in particular, industrially used adsorbents are, for example, activated carbon and bone charcoal, alumina gel, silica gel, bleaching earths, kieselguhr, activated bauxite and certain alumosilicates. Depending on the type of binding entered by the adsorbed substance with the adsorbent, a distinction is made, as is known, between physical and chemical adsorption, only physical adsorption in turn being of importance for industrial separations of substances. As is known, this takes place only on the basis of intermolecular forces (van der Waals forces) and is reversible, whereas chemical adsorption, also called chemisorption, is frequently irreversible.

Purely physical adsorption comprises, as is known, the formation of monomolecular layers, or also multimolecular layers in the case of higher loadings, on the adsorbent surfaces having active secondary valencies. With respect to the temperature dependence of the adsorption, it is a fact here that the equilibrium loadings decrease with increasing temperature at constant composition of the fluid phase. This means that the adsorption force is reduced by heating and increased by cooling. As is also known, the adsorption equilibria are, moreover, widely non-linear. The adsorption rate, i.e. the rate at which the adsorption equilibrium is established, depends essentially on the diffusion of the adsorbed substance in the adsorbent. This means that above all the properties of the adsorbent, namely the porosity, particle size and chemical composition and, on the other hand, also the molecular weight and the molecular structure of the adsorbate, are decisive. The times for the adsorption equilibrium to be established can be between a few seconds and minutes for industrial adsorbents.

Another important advantage of adsorption is, as is known, its selectivity which can be very high, above all in the case of low concentrations of the substance to be adsorbed.

Examples of the industrial application of adsorbents are, inter alia, the solvent recovery from air by means of activated carbon in plants operating with low-boiling solvents and the removal of organic substances by means of activated carbon in water purification. In the latter sector, the so-called "oil pest" most recently represents, as is known, an increasingly more urgent problem of water pollution by organic substances in the world swamped by technology. The expression oil pest is a graphic description of the water pollution by mineral oils due to unqualified and careless handling, corroded oil tanks, transport damage to land and sea with the consequence of many types of misplacings of mineral oils or refined variants thereof. As a consequence, a pollution of ground water, inland waters and the sea threatens or already exists worldwide. It must be stressed here that, on the one hand, even 1 l of mineral oil can make up to 5 million l of water unsuitable for use as drinking water and, on the other hand, the annual total introduction of oil into the seas in recent times is estimated to be about 6 million tonnes. As is known, about 35% thereof are said to originate from tankers as a result of tank cleaning (about 23%) and accidents (about 10%), 10% from natural sources and 1% from drilling islands in the sea, but 54% reach the sea from the land through rivers, rain and other effects. On the basis of the current state of knowledge, it appears to be established that the oil pest threatens the entire world of oceanic organisms and impairs the ecological equilibrium on earth. In spite of this ominous situation, the disposal and destruction measures hitherto taken with regard to water-polluting oil obviously have an only more or less local character in the acute case of disasters. Attempts are then made in general first to obtain limitation of the cause by mechanical means and, in addition, to soak up the oil by means of diverse oil binders such as, for example, plastic foams, mixtures of peat and iron powders, straw, paper fibers and the like, and either to remove it from the water or cause it to sink by means of detergents. Skimming of the oil from the surface of a calm sea, using special ships, is also practiced fairly frequently on various occasions. In the case of minor contaminations on solid surfaces, resort is taken to removal of the contaminated soil or to a superficial treatment thereof with oil-soaking or oil-binding agents such as, for example, the clay mineral attapulgite (magnesium aluminum silicate) or other adsorbents. Examples of those used are, inter alia, finely disperse adsorbents such as Aerosil, diatomaceous earth, cellulose, cereal flour, wood flour, sawdust, kieselguhr, silica gel, powdered brick, powdered loam, activated carbon, bleaching earth or, in some cases, also ground lime or ground cement.

To control oil pest on solid surfaces, particularly on, for example, roads, concrete surfaces or textile floor coverings and, in some cases, also on water surfaces, the oil layers are in general sprinkled with a finely disperse adsorbent in the required quantity and layer thickness, so that the oil is soaked up by the adsorbent. The adsorbent laden with adsorbate should here arise in the most particulate or compacted form possible without adhering liquid oil residues, so that it can be collected mechanically and passed to disposal. In some cases, absorbent cleaning wools, cleaning rags or paper are placed on top of oil layers, if necessary, so that they adsorptively soak up the oil until they are saturated and can thus make oil removal and/or disposal possible.

The adsorbents hitherto disclosed and, inter alia, used for controlling oil pest show, however, serious disadvantages in their application, which can restrict or even exclude their applicability. Disclosed disadvantages in this respect are, inter alia, an inadequate adsorption capacity, formation of too high a quantity of residues or ash during disposal by incineration, particularly in the case of the inorganic adsorbents, hydrophilic behaviour or pronounced swelling in water in place of preferential oil adsorption, sinking of the adsorbent laden with adsorbate in water, extensive fouling of the application surfaces by the adsorbent itself, for example in the case of activated carbon, troublesome bleeding of adsorbate from adsorbent laden with adsorbate during temporary storage.

It was the object of the present invention to make an adsorbent available which, while overcoming the above disadvantages, is accessible in a simple manner and in constant quality, can be applied without problems and pollution of the environment and, in the disposal of the adsorbate by incineration, can be burned without residue and pollutants, has a high adsorptive binding power towards diverse liquid organic materials, especially mineral oil, and, after it has been loaded with adsorbate can be handled easily and without problems preferably collected, transported, stored and, if appropriate, incinerated.

According to the present invention, this object can be achieved by means of polyvinyl acetals which are insoluble in water and in the adsorbates and are preferably used as finely disperse to granular products in adsorbents.

The invention therefore relates to a solid adsorbent for soaking up or binding adsorbates from the group comprising mineral oils, ester oils, liquid hydrocarbons and liquid inert organic compounds, the adsorbent having no significant solubility in the adsorbates and the adsorbates being immiscible with water, which comprises a finely disperse to granular, water-insoluble polyvinyl acetal.

The polyvinyl acetal molecules contain acetal radicals having preferably 1 to 12 carbon atoms, especially 1 to 8 and particularly preferably 2 to 6 carbon atoms.

A particularly preferred polyvinyl acetal is polyvinyl butyral, whose macromolecules preferably contain 10 to 28% by weight, especially 11 to 22 and particularly preferably 12 to 18% by weight of vinyl alcohol units and preferably 0 to 3% by weight, especially 1 to 3 and particularly preferably 2 to 3% by weight of vinyl acetate units, relative to the total polyvinyl butyral polymer.

The polyvinyl acetals can be prepared by conventional known methods, for example preferably from polyvinyl alcohols and aldehydes with the addition of an acidic catalyst, preferably in aqueous solution. The vinyl alcohol units and vinyl acetate units, which may be present in the preferably used polyvinyl butyral (PVB), can be the result, when starting polyvinyl alcohols are used such as can be obtained by hydrolysis of polyvinyl acetate and still contain residual vinyl acetate units in their macromolecules. The molecular weight of the polyvinyl acetals can vary within a wide range. The molecular weight of the starting polyvinyl alcohol on which the polyvinyl acetal is based can, for example, be utilized as a measurement parameter. Preferably, polyvinyl alcohols having molecular weights between about 2,000 and about 250,000, especially about 10,000 to about 100,000, are used, and these polyvinyl alcohols can be partially to fully saponified. The polyvinyl alcohols regarded here as fully saponified are those in which between 98 and 100% of the original vinyl ester units have been saponified to vinyl alcohol units. Preferably, fully saponified starting polyvinyl alcohols are used.

The measure used for the molecular weight of the polyvinyl acetals can also be their viscosity in organic solvents such as, for example, in methanol or n-butanol. Thus, for example, the viscosity of polyvinyl butyrals (PVB) used according to the invention, measured in a 6% by weight methanol solution at 20° C. according to Höppler (DIN 53015), is preferably in the range from 1 to 300 mPa·s, especially 10 to 200 and particularly preferably 15 to 110 mPa·s. In general, preference is given to the higher-molecular part of the molecular weight range of the polyvinyl acetals.

The density of the preferably used PVB's at 20° C. is preferably about 1.1 g/cm$^3$, and the bulk density of the finely disperse to granular products is especially in the range from 150 to 250 g per liter. The latter products are directly obtained in the preparation as white, finely pulverulent granules. The melting point of the PVB's is in general preferably above 120° C.

The mean particle diameter of polyvinyl acetals to be used according to the invention is preferably in the range from 0.1 to 2.5 mm, especially 0.2 to 0.8 and particularly preferably 0.3 to 0.5 mm. With very particular preference, it is 0.4 mm.

The finely disperse to granular polyvinyl butyral particles to be used according to the invention preferably have a porous structure.

They are soluble neither in water nor in the compounds, envisaged as adsorbate components, from the group comprising mineral oils, ester oils, liquid hydrocarbons, liquid inert organic compounds or mixtures thereof and can adsorptively bind up to twice their own weight, preferably more than twice their own weight, of adsorbate.

Adsorbents to be used according to the invention are composed particularly preferably of polyvinyl butyral.

In a further preferred variant, the adsorbent represents a two-dimensional formation, preferably in the form of oil-permeable films or sheets, mats, tarpaulins or nonwovens, especially sandwich-type two-dimensional formations with multi-chamber structures containing polyvinyl acetal particles, which formation contains polyvinyl acetal, preferably PVB, in uniform beds, secured from running out, preferably in layer thicknesses from 0.5 to 5 cm.

The use of the adsorbents according to the invention preferably takes place in such a way that the liquid which is to be disposed of or to be adsorbed is sprinkled with the requisite applied quantity of adsorbent, relative to the adsorbate to be disposed of, or covered or contacted with a two-dimensional adsorbent according to the invention and, after the adsorption step has ended, the adsorbent, especially in the particulate form, covered with adsorbate is collected, preferably without adhering liquid oil residues, and, if appropriate, subsequently disposed of, preferably by incineration or by landfill or by reprocessing if possible. The collection can here be effected, for example, by sweeping, suction or, on water surfaces, for example by skimming. The adsorbent fully covered with liquid adsorbate should, as far as possible, not be subjected to any very high compression forces during collection and transport, since this can lead in some cases to the release of liquid adsorbate. On the other hand, adsorbents laden with adsorbate, which in general arise in a loose, particulate form, can be, for example, briquetted in suitable presses with partial deoiling and the resulting briquettes can be burnt or put into landfill.

Adsorbents according to the invention, when supersaturated with adsorbate, can in some cases also form gel-like masses which behave like a pudding and can easily be broken up and collected and passed to disposal. Such gellike masses can preferably form on contact with those adsorbates which, although they cause swelling of the polyvinyl acetal, are unable to dissolve it.

A further particularly interesting application of adsorbents according to the invention is, inter alia, that external contaminations with lubricating oil or hydraulic oil on machines can easily be removed by sprinkling the oiled surfaces with sufficient quantities of finely disperse polyvinyl acetals and, after adsorption has taken place, sweeping the adsorbate-laden adsorbent away with a broom or sucking it off, collecting it and disposing of it. In this way, the machines can easily and without wet washing be freed of externally adhering oil, in particular without a potential risk of causing damage to sliding surfaces, bearing damage, corrosion damage or surface damage on the machines, as would have to be feared, for example, with an analogous use of conventional granular inorganic adsorbents.

With particular advantage, preferably PVB can be used for the adsorption of light fuel oil, where the soaking-up process starts immediately when PVB is sprinkled on and the adsorption can be complete already after a few minutes. In this case, the PVB does not gel but remains granular and solid after the adsorptive loading with light fuel oil has taken place. PVB is therefore particularly suitable for surrounding spilled pools of fuel oil, for example on concrete surfaces or roads, as an immediate measure with a boom of a sprinkled PVB layer and thus restricting a further spread of the oil pool.

To counteract troublesome wind dispersal, mean particle diameters of at least 1 mm, preferably 1 to 2.5 mm, are preferred when, for example, PVB is used in the open.

Preferably, adsorbents according to the invention can be used especially for soaking up or binding and, as appropriate, for subsequent conventional disposal or reprocessing of products, which may acutely pollute the environment under corresponding threatening conditions, from the group comprising crude oil, tar oil, lubricating oil, lubricating grease, mineral oil, petroleum, hydraulic oil, paraffin oil, spindle oil, light and heavy fuel oil, diesel oil, kerosene, gasoline, benzene, liquid organic pesticides or pesticide solutions, vegetable oils and fats, animal oils and fats and, if appropriate, aqueous emulsions or suspensions of the said products. The aqueous emulsions or suspensions can advantageously be adsorptively extracted by treatment with finely disperse polyvinyl acetals. Oil can also be removed from oil-contaminated water, if it is filtered over a filter of preferably coarse-grained and fine-grained PVB.

I claim:

1. In a method of soaking up or binding water-insoluble adsorbates selected from the group consisting of ester oils, liquid inert organic compounds and mixtures thereof in a solid absorbent having no significant solubility in the absorbates, the improvement comprising using as the solid absorbent a finely dispsere to granular, water-insoluble polyvinyl acetal.

2. The method of claim 1 wherein the absorbate is selected from the group consisting of crude oil, tar oil, lubricating oil, lubricating grease, mineral oil, petroleum, hydraulic oil, paraffin oil, spindle oil, light and heavy fuel oil, diesel oil, kerosene, gasoline, benzene, liquid organic pesticides or pesticide solutions, vegetable oils and fats, animal oils and fats and aqueous emulsions or suspensions of the said products.

* * * * *